(12) United States Patent
Kiefer et al.

(10) Patent No.: US 11,298,641 B2
(45) Date of Patent: Apr. 12, 2022

(54) MERCURY CAPTURE SYSTEMS AND METHODS OF MAKING AND USING THE SAME

(71) Applicant: The Corporation of Mercer University, Macon, GA (US)

(72) Inventors: Adam Mitchell Kiefer, Macon, GA (US); Laura Waneta Lackey, Macon, GA (US)

(73) Assignee: THE CORPORATION OF MERCER UNIVERSITY, Macon, GA (US)

( * ) Notice: Subject to any disclaimer, the term of this patent is extended or adjusted under 35 U.S.C. 154(b) by 313 days.

(21) Appl. No.: 16/422,546

(22) Filed: May 24, 2019

(65) Prior Publication Data

US 2019/0358570 A1    Nov. 28, 2019

Related U.S. Application Data

(60) Provisional application No. 62/675,886, filed on May 24, 2018.

(51) Int. Cl.
*B01D 45/08* (2006.01)
*B01D 53/00* (2006.01)

(52) U.S. Cl.
CPC ............ *B01D 45/08* (2013.01); *B01D 53/002* (2013.01)

(58) Field of Classification Search
CPC .............................. B01D 45/08; B01D 53/00
See application file for complete search history.

(56) References Cited

U.S. PATENT DOCUMENTS

| | | | | |
|---|---|---|---|---|
| 3,755,989 A * | 9/1973 | Fornoff | ................. | B01D 53/04 95/134 |
| 4,732,739 A * | 3/1988 | Yamamura | ............. | A61C 19/00 366/602 |
| 2007/0246401 A1* | 10/2007 | Al-Faqeer | .............. | B01D 53/75 208/251 R |

* cited by examiner

*Primary Examiner* — Youngsul Jeong
(74) *Attorney, Agent, or Firm* — Withers & Keys, LLC

(57) ABSTRACT

Mercury capture systems are disclosed. Methods of making and using mercury capture systems are also disclosed.

18 Claims, 18 Drawing Sheets

MERCURY CAPTURE SYSTEMS AND METHODS OF MAKING AND USING THE SAME

CROSS-REFERENCE TO RELATED APPLICATIONS

This patent application claims the benefit of priority to U.S. Provisional Patent Application Ser. No. 62/675,886 filed on May 24, 2018 and entitled "MERCURY CAPTURE SYSTEMS AND METHODS OF MAKING AND USING THE SAME," the subject matter of which is hereby incorporated by reference in its entirety.

FIELD OF THE INVENTION

The present invention is directed to mercury capture systems. The present invention is further directed to methods of making and using mercury capture systems.

BACKGROUND

Mercury is a potent neurotoxin that can affect people of all ages. Artisanal and small-scale gold mining (ASGM) is recognized as the number one source of anthropogenic mercury emissions to air. Miners use mercury to amalgamate gold, concentrating the gold in the mercury and separating it from undesirable gangue minerals. The resulting solid amalgam is between 40-60% by mass mercury, and is heated by open flame to evaporate the mercury, revealing the processed amalgam (sponge gold or doré). The processed amalgam is estimated to be ~5% by mass mercury. The processed amalgam is then brought to a gold shop where it is further heated by the owner/employee of the shop, releasing mercury into the environment. These gold shops are often located in urban/residential areas where others are exposed to high concentrations of the mercury being eliminated. Occasionally, the entire amalgam will be heated in a gold shop.

Currently, miners and gold shop owners routinely heat the amalgam with an open flame torch (e.g., propane, compressed gasoline, etc.). The heating is often done in the open air or using rudimentary retorts. Occasionally, gold shops will employ ventilation systems consisting of blacksmith fans, vacuum cleaners, etc. These systems are ineffective and result in high concentrations of mercury vapor being released into the room and discharged into the surrounding environment.

For example, currently, gold shop owners in South America use untested MCSs of their own design, including (1) ones that do not have a fan to remove the mercury from the shop and rely on the heat from the flame to drive mercury from the room, (2) ones which utilize household vacuum cleaners that return the mercury directly into the gold shop, and (3) ones that pass the heated mercury vapor over a water bath. In the latter system, the system was intended to condense mercury in the water bath, but copious amounts of mercury condense on the outside of the system. In the fall of 2017, gold shops with these MCSs were evaluated while shut-down (i.e., not operating) and the concentrations of mercury were found to exceed 200,000 ng/m$^3$. While operating, concentrations of mercury on the sidewalk outside of the gold shop exceeded 2,000,000 ng/m$^3$, exceeding the detection limit for the spectrometer used to monitor concentrations.

Prior mercury capture systems also include a mercury capture system developed by the US Environmental Protection Agency (EPA) and Argonne National Laboratories in 2008. This mercury capture system was developed for deployment in Brazil and Peru. The EPA design employed components to remove mercury from the burning area. While tested upon deployment, no follow-up work was conducted to determine the efficiency or life span of the EPA MCS.

In 2013, the Minamata Convention, an international treaty signed by over 120 nations, recognized the danger that ASGM pose to both environmental and human health and safety, and sought increased awareness and cooperation to reduce emissions from ASGM with the ultimate goal of replacing mercury entirely. Annex C of the Minamata Convention calls on signatory nations to develop a National Action Plan (NAP) that outlines actions to eliminate the " . . . open burning of amalgam or processed amalgam" and the "burning of amalgam in residential areas."

There is a need in the art for improved mercury capture systems that can be employed to (1) separate the user from the toxic mercury vapor evolved, (2) safely transport the mercury out of the location where the amalgam is being heated and away from populated areas, and (3) condense the majority of mercury preventing its emission to the air and allowing the reuse/resale of the mercury.

SUMMARY

The present invention addresses some of the difficulties and problems discussed above by the discovery of new mercury capture systems. The mercury capture systems of the present invention can be used to (1) separate a user (e.g., an amalgam processor, a miner, gold shop owner or employee, etc.) from toxic mercury vapor evolved from an amalgam processing method, (2) safely transport captured mercury out of the location where the amalgam is being heated and away from populated areas, and (3) condense a majority of the captured mercury preventing its emission to the air and allowing the reuse/resale of the recovered mercury.

Accordingly, the present invention is directed to mercury capture systems. In one exemplary embodiment, the mercury capture system of the present invention comprises: at least one conduit extending between a mercury vapor source and a first outlet of said mercury capture system; a fan positioned at the first outlet of said mercury capture system; and a mercury vapor collecting vessel (i) positioned between and (ii) in fluid communication with the mercury vapor source and the first outlet of said mercury capture system, wherein the mercury capture system reduces an amount of mercury within a first outlet fluid passing through the at least one conduit from proximate the mercury vapor source and exiting the first outlet of said mercury capture system. This system desirably reduces mercury to a level of less than about 35,000 ng/m$^3$ (or even less) at the source of burning.

The present invention even further relates to methods of making mercury capture systems. In one exemplary embodiment, the method of making a mercury capture system comprises: forming at least one conduit, the at least one conduit being extendable between a mercury vapor source and a first outlet of the mercury capture system; positioning a fan at the first outlet of the mercury capture system; and positioning a mercury vapor collecting vessel (i) between and (ii) in fluid communication with the mercury vapor source and the first outlet of the mercury capture system.

The present invention even further relates to methods of using mercury capture systems. In one exemplary embodiment, the method of using a mercury capture system comprises (I) positioning (a) a mercury capture system near a mercury vapor source, the mercury capture system comprising: (1) at least one conduit extending between the mercury vapor source and a first outlet of the mercury capture system; and (2) a fan positioned at the first outlet of the mercury capture system; and (II) cutting on the fan, wherein the mercury capture system reduces an amount of mercury within a first outlet fluid passing through the at least one conduit from proximate the mercury vapor source and exiting the first outlet of the mercury capture system.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION

Figure 1:
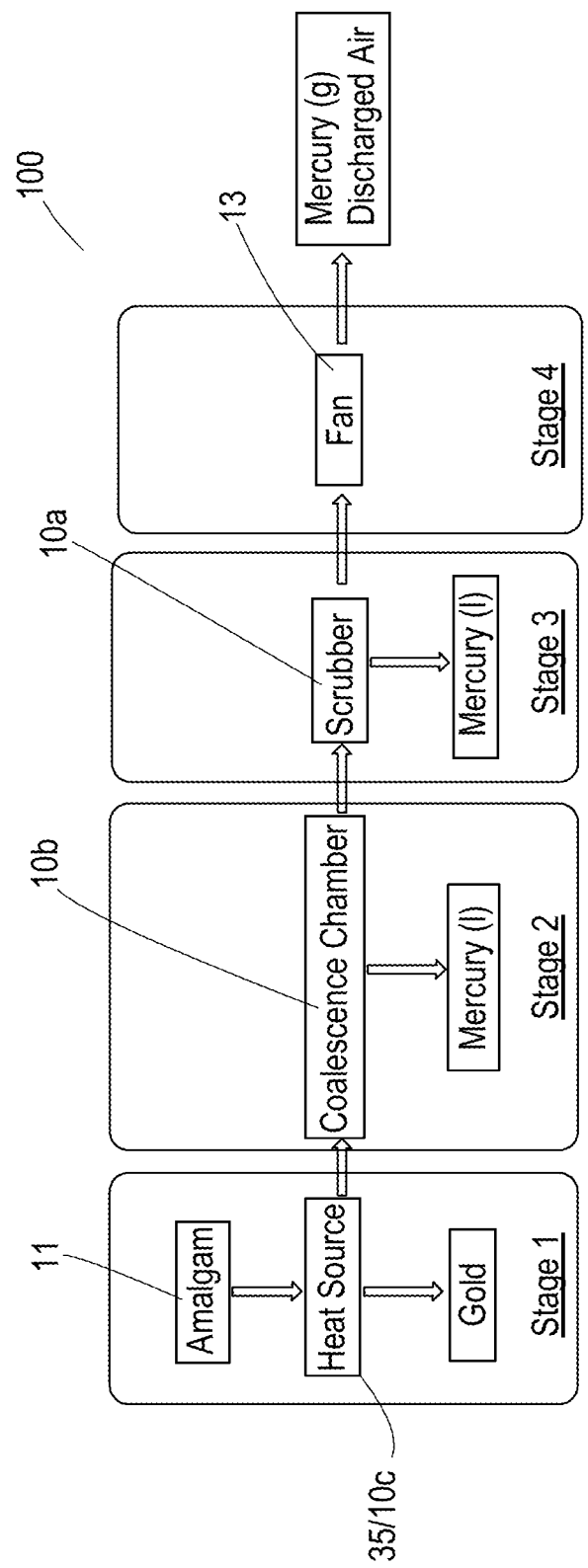
FIG. 1 depicts a unit process view of various stages of an exemplary mercury capture system and method of the present invention.
Figure 2A:
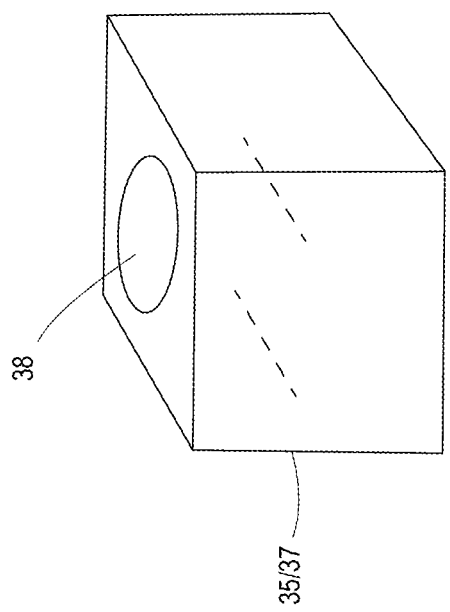
FIGS. 2A-3C depict various system components in the form of exemplary conductive heating elements and induction heating elements suitable for use in stage 1 of the exemplary mercury capture system and method shown in FIG. 1.
Figure 2B:
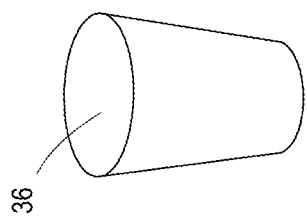
Figure 3A:
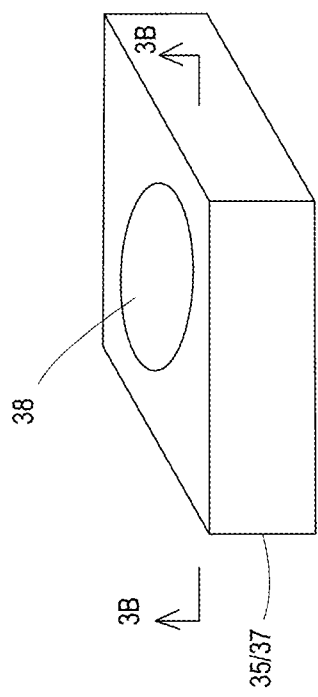
Figure 3B:
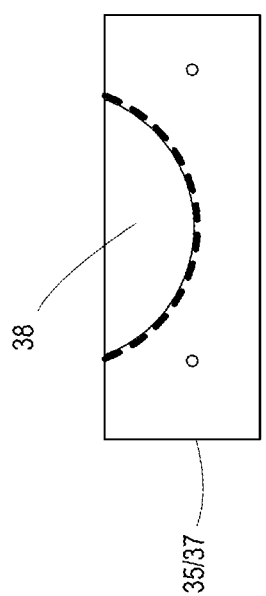
Figure 3C:
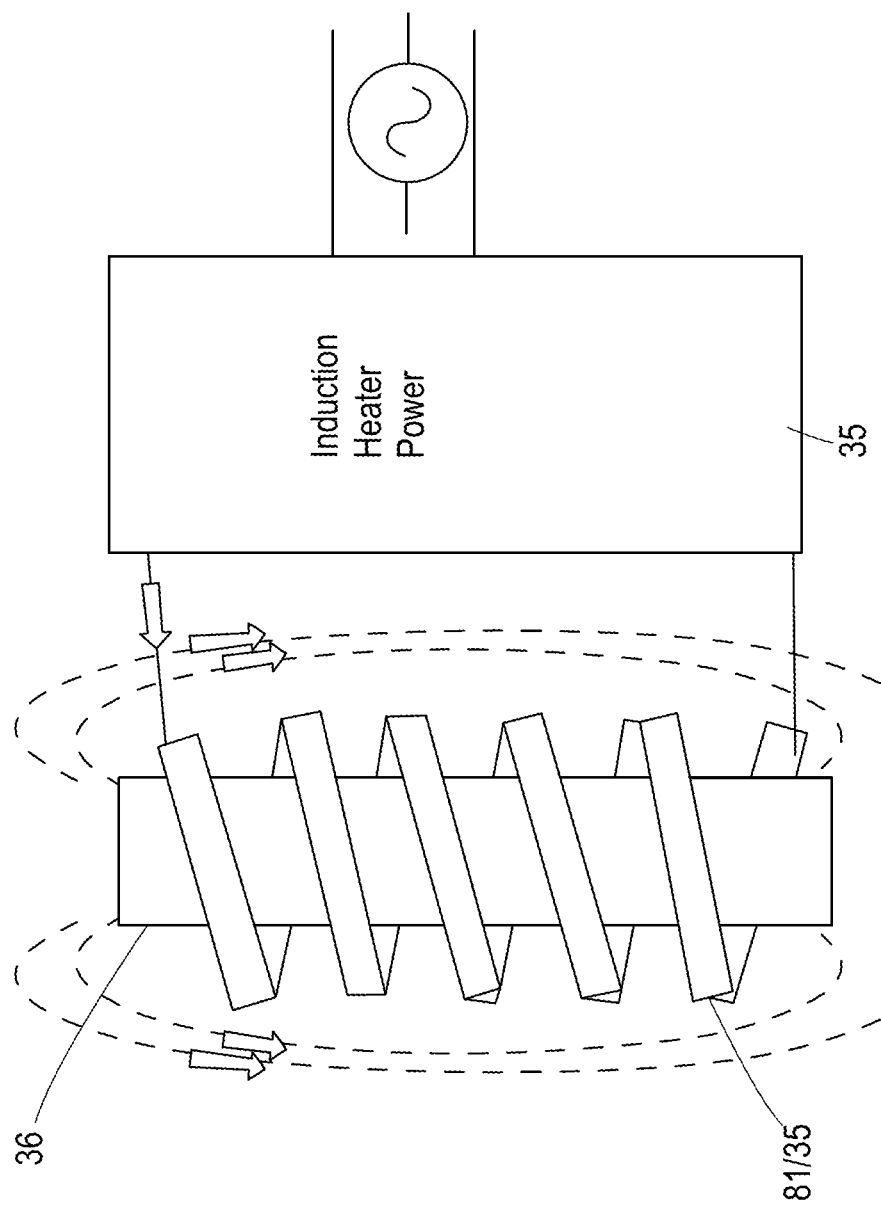

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to mercury capture systems (MCS). The mercury capture systems are particularly suitable for use by (1) artisanal and small-scale miners working individually or in collectives, (2) processing plants that house equipment that aids in the extraction of gold from ore, and (3) owners of gold shops who buy and sell amalgams, processed amalgams (i.e., pre-heated amalgams known as sponge gold or doré), and refined gold. As designed, the mercury capture systems of the present invention serve multiple purposes. The mercury capture systems of the present invention remove mercury vapor from the immediate area where amalgam is being burned, desirably reducing mercury exposure of the user/operator from greater than 2,000,000 $ng/m^3$ to less than about 35,000 $ng/m^3$ mercury (or even less). The MCS also allows for the condensation of the mercury vapor to reform liquid mercury. The collected mercury can be purified and resold to miners for further use.

The mercury capture systems of the present invention reduce the concentration of mercury at the location of burning while removing the majority of mercury from the discharged air. In some embodiments, the mercury capture systems of the present invention desirably comprise (or consist of) four stages:

Stage 1—heating the amalgam via one or more of: (1) an open flame, (2) induction or (3) conduction;

Stage 2 coalescence and condensation chamber(s) comprising or consisting of: (1) large container(s) equipped with baffles and/or impaction plates that separate condensed mercury from a gas stream, (2) cyclones that separate aerosolized mercury from the air via inertial impaction, and/or (3) a water-cooled condenser that separates the mercury from the air via temperature-dependent condensation;

Stage 3—a mercury scrubber comprising or consisting of impact plates, cooling jacket(s), internal condenser(s), and/or high surface area materials such as river rocks, ice cubes, steel wool, activated carbon, etc.; and Stage 4—a fan for drawing the vapor through the system such as an in-line PVC fan, a blacksmith's forge, etc.

Stage 1 of the mercury capture systems of the present invention is where the amalgam or processed amalgam is heated. Miners and gold shop owners throughout Central and South America currently use an open flame (i.e., a propane torch) to actively heat the amalgam. This process is inherently inefficient as the vast majority of energy is not transferred to the amalgam itself but the surrounding environment. The heated gases evolved during the combustion of the propane carry mercury vapor away from the processor. As effluent from the heating process cools, condensed mercury forms aerosols that are targeted for removal in the remainder of the system.

As an alternative to using an open flame, in some embodiments of the present invention, direct heating through conduction or induction can be used to vaporize the mercury from the amalgam. These direct heating processes result in a decrease in superheated air produced during the 'burn' process when compared to heating with a propane torch. As a result, much less energy needs to be dissipated from the process gas stream prior to reaching temperatures necessary for mercury condensation. In some embodiments of the present invention, a vessel has been designed that employs a cast iron block heated by commercially available cartridge heaters and/or band heaters. An opening in the block allows for the placement of a stainless steel crucible holding an amalgam. The amalgam is heated via conduction to temperature exceeding the boiling point of elemental mercury (357° C.), and is controlled by commercially available controllers and the temperature monitored by a thermocouple. See, for example, the exemplary combustion elements shown in FIGS. 2A-3B.

Similarly, in some embodiments of the present invention, the amalgam can be placed in a crucible (e.g., formed from graphite, iron, tungsten, quartz, fused silica, ceramic, etc.) and heated via induction. When the crucible is heated via induction, energy is transferred to the amalgam and the mercury is boiled off. See, for example, the exemplary combustion elements shown in FIG. 3C.

Conductive and inductive systems of heating, desirably used in the present invention instead of propane heating (although propane heating could be used in combination with other mercury capture system components shown in Stages 1-4), represents a major change to the propane heating of amalgams in ASGM, where a flame is often used in the open air. The conductive and inductive systems of heating allow for a controlled heating of the amalgam or processed amalgam. This controlled heating (i) potentially allows for controlled vaporization on elemental mercury, (ii) potentially decreases the oxidation of the evolved elemental mercury, (iii) provides increased safety for the miner, as amalgams that are rapidly heated can explode, and/or (iv) decreases the temperature of the mercury and air transported to Stage 2 of the MCS, thus decreasing coalescence time and improving recovery of mercury Stage 2 of the mercury capture systems of the present invention induces the condensation of mercury vapor to liquid using 1) heat transfer to allow for aerosol formation, (2) turbulence to encourage aerosol coalescence resulting in an aerosol particle size increase, and (3) aerosol impaction resulting in mercury removal from the process. The residence time of the vapor is dependent upon a variety of factors including, but not limited to, the temperature of the gas stream fluid flow path, etc. This is the first stage of the mercury capture systems of the present invention where mercury coalesces and is captured by the system.

Stage 3 of the mercury capture systems of the present invention removes particulate mercury not captured in Stage 2. Air is drawn through a series of baffles and impact plates forcing the smaller molecules to collide with one another or the plates themselves, forming larger particles that can be collected at the bottom of the scrubber. Similarly, a condenser can be used to cool the air passing through Stage 3, condensing the mercury based upon temperature differential.

Stage 4 of the mercury capture systems of the present invention is a commercially available fan used to draw air through Stages 1-4. The speed of the fan is desirably adjustable so that a desired face velocity at stage one is achieved, and a desired retention time in Stages 2-3 is maintained. The fan is positioned at the end of the mercury capture systems of the present invention so as to allow for easy monitoring and replacement.

The present invention is further directed to methods of making mercury capture systems as discussed herein. The present invention is even further directed to methods of using mercury capture systems to capture mercury during an amalgam treatment process as discussed herein.

An exemplary mercury capture system 100, and its various stages and components, are depicted in FIGS. 1-22. A description of exemplary mercury capture system 100, and its various stages and components, as depicted in FIGS. 1-22, is provided below. In addition, the mercury capture systems and methods of making and using the mercury capture systems of the present invention are further described in the following embodiments.

OTHER EMBODIMENTS

Mercury Capture Systems

1. A mercury capture system 100 comprising: at least one conduit 10 extending between a mercury vapor source 11 and a first outlet 12 of said mercury capture system 100; a fan 13 positioned at the first outlet 12 of said mercury capture system 100; and a mercury vapor collecting vessel 14 (i) positioned between and (ii) in fluid communication with the mercury vapor source 11 and the first outlet 12 of said mercury capture system 100, wherein the mercury capture system 100 reduces an amount of mercury within a first outlet fluid passing through the at least one conduit 10 from proximate the mercury vapor source 11 and exiting the first outlet 12 of said mercury capture system 100. Desirably, the mercury capture systems of the present invention, such as mercury capture system 100, reduce an amount of mercury within the first outlet fluid passing through the at least one conduit 10 from proximate the mercury vapor source 11 and exiting the first outlet 12 of said mercury capture system 100 to a level of less than about 100,000 ng/m$^3$ of first outlet fluid (or any value less than 100,000 ng/m³ of first outlet fluid, in increments of 1 ng/m³ of first outlet fluid, e.g., 35,000 ng/m³ of first outlet fluid, or any range of values less than 100,000 ng/m³ of first outlet fluid, in increments of 1 ng/m³ of first outlet fluid, e.g., a level of from about 25,000 ng/m³ to about 35,000 ng/m³ of first outlet fluid). More desirably, the mercury capture systems of the present invention, such as mercury capture system 100, reduce an amount of mercury within the first outlet fluid passing through the at least one conduit 10 from proximate the mercury vapor source 11 and exiting the first outlet 12 of said mercury capture system 100 to a level of less than about 35,000 ng/m³ of first outlet fluid (or any value less than 35,000 ng/m³ of first outlet fluid, in increments of 1 ng/m³ of first outlet fluid, e.g., 33,018 ng/m³ of first outlet fluid, or any range of values less than 35,000 ng/m³ of first outlet fluid, in increments of 1 ng/m³ of first outlet fluid, e.g., a level of from about 18,025 ng/m³ to about 33,033 ng/m³ of first outlet fluid). In some embodiments, a vacuum pump 84 may be used instead of a fan 13. See, for example, FIGS. 20-21.

2. The mercury capture system 100 of embodiment 1, wherein said at least one conduit 10 comprises a mercury scrubber section 10a positioned between the mercury vapor collecting vessel 14 and the first outlet 12 of said mercury capture system 100, the mercury scrubber section 10a comprising one or more baffle assemblies 40 positioned along a length of the mercury scrubber section 10a.

3. The mercury capture system 100 of embodiment 2, wherein said of said mercury capture system 100 comprises a second outlet 15 in fluid communication with the mercury vapor collecting vessel 14.

4. The mercury capture system 100 of any one of embodiments 1 to 3, wherein said at least one conduit 10 comprises a middle connecting section 10b positioned between the mercury vapor source 11 and the mercury vapor collecting vessel 14.

5. The mercury capture system 100 of any one of embodiments 1 to 4, wherein said at least one conduit 10 comprises a furnace section 10c positioned between the mercury vapor source 11 and the first outlet 12.

6. The mercury capture system 100 of any one of embodiments 3 to 5, wherein said mercury scrubber section 10a extends vertically between the mercury vapor collecting vessel 14 and the first outlet 12.

7. The mercury capture system 100 of any one of embodiments 4 to 6, wherein said middle connecting section 10b extends diagonally downward from a position 16 above the mercury vapor source 11 to the mercury vapor collecting vessel 14. See, for example, FIG. 11.

8. The mercury capture system 100 of any one of embodiments 5 to 7, wherein said furnace section 10c extends vertically between the mercury vapor source 11 and a position 16 above the mercury vapor source 11.

9. The mercury capture system 100 of any one of embodiments 4 to 8, wherein said middle connecting section 10b extends diagonally downward from a furnace section outlet 17 to a scrubber inlet 18 along the mercury scrubber section 10a. See, for example, FIG. 11.

10. The mercury capture system 100 of embodiment 9, wherein the scrubber inlet 18 is positioned above the mercury vapor collecting vessel 14 along the mercury scrubber section 10a.

11. The mercury capture system 100 of embodiment 9 or 10, wherein the scrubber inlet 18 is positioned a distance $d_{si}$ from a first end 19 of the mercury scrubber section 10a. See, for example, FIG. 11.

12. The mercury capture system 100 of any one of embodiments 1 to 11, wherein said fan 13 is coaxially positioned within a cross-sectional exit area of the first outlet 12.

13. The mercury capture system 100 of any one of embodiments 1 to 12, wherein said mercury vapor collecting vessel 14 is positioned directly below and in-line with said fan 13.

14. The mercury capture system 100 of any one of embodiments 5 to 13, wherein said furnace section 10c comprises a furnace inlet 20, said furnace inlet 20 being along a side surface 21 of said furnace section 10c.

15. The mercury capture system 100 of any one of embodiments 5 to 14, wherein said furnace section 10c comprises a reduced diameter portion 22 of said furnace section 10c positioned between a furnace inlet 20 and a furnace outlet 17.

16. The mercury capture system 100 of any one of embodiments 2 to 15, wherein said mercury scrubber section 10a comprises a reduced diameter portion 23 positioned between the mercury vapor collecting vessel 14 and the first outlet 12.

17. The mercury capture system 100 of any one of embodiments 3 to 16, wherein said second outlet 15 is at a first end 19 of said mercury scrubber section 10a proximate the mercury vapor collecting vessel 14.

18. The mercury capture system 100 of any one of embodiments 2 to 17, wherein said first outlet 12 is an outlet 24 of the mercury scrubber section 10a.

19. The mercury capture system 100 of any one of embodiments 4 to 18, wherein said middle connecting section 10b comprises a baffle box 25, said baffle box 25 comprising one or more baffle plates 26 therein. See, exemplary baffle plate 26 in FIG. 12.

20. The mercury capture system 100 of embodiment 19, wherein said baffle box 25 comprising two or more baffle plates 26 therein. It should be noted that any number of baffle plates 26 may be used within baffle box 25. Typically, from about 2 to about 12 baffle plates 26 are present within a given baffle box 25.

21. The mercury capture system 100 of embodiment 19 or 20, wherein each baffle plate 26 comprising a plurality of apertures 27 extending through and providing multiple air flow channels through a given baffle plate 26.

22. The mercury capture system 100 of any one of embodiments 19 to 21, wherein each baffle plate 26 is positioned within the baffle box 25 so as to at least partially impede fluid flow of the first outlet fluid through the baffle box 25.

23. The mercury capture system 100 of any one of embodiments 19 to 22, wherein each baffle plate 26 is positioned substantially perpendicular to a fluid flow direction of the first outlet fluid through the baffle box 25.

24. The mercury capture system 100 of any one of embodiments 19 to 23, wherein (i) a lower surface 28 of the baffle box 25 and (ii) a lower surface 29 of any portion of the middle connecting section 10b between the baffle box 25 and an outlet 30 of the middle connecting section 10b forms a diagonally downward extending line into a scrubber inlet 18 of the mercury scrubber section 10a or the mercury vapor collecting vessel 14.

25. The mercury capture system 100 of any one of embodiments 5 to 24, wherein a furnace inlet 20 is positioned above the mercury vapor collecting vessel 14. (This is an alternative embodiment that is not shown in the figures)

26. The mercury capture system 100 of any one of embodiments 5 to 25, further comprising a first table or stool 31, said first table or stool 31 being sized to structurally support the furnace section 10c of the mercury capture system 100.

27. The mercury capture system 100 of any one of embodiments 2 to 26, further comprising a second table or stool 32, said second table or stool 32 being sized to structurally support the mercury scrubber section 10a of the mercury capture system 100.

28. The mercury capture system 100 of embodiment 27, wherein second table or stool 32 comprises an aperture 33 therethrough such that a lower portion 34 of the mercury scrubber section 10a extends through the aperture 33. See, for example, FIG. 17.

29. The mercury capture system 100 of any one of embodiments 1 to 28, further comprising a heat source 35 to heat amalgam containing mercury (not shown).

30. The mercury capture system 100 of any one of embodiments 1 to 29, further comprising one or more conductive or induction heating elements 35.

31. The mercury capture system 100 of embodiment 30, wherein said one or more conductive or induction heating elements 35 comprise a crucible 36, a heating block 37, a cast iron block (not shown), one or more cartridge heaters (not shown), one or more band heaters (not shown), one or more temperature controllers (not shown), one or more temperature monitors (not shown), or any combination thereof. As shown in FIGS. 2A-3B, exemplary heating blocks 37 comprise a hole/indentation 38 therein sized to receive and support an amalgam-receiving vessel (e.g., exemplary crucible 36).

Figure 5A:
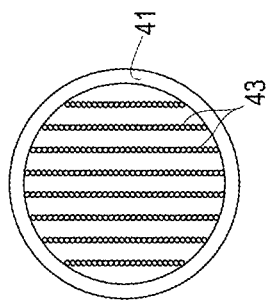
FIGS. 5A-5B depict exemplary baffle designs suitable for use in stage 3 of the exemplary mercury capture system and method shown in FIG. 1.
Figure 5B:
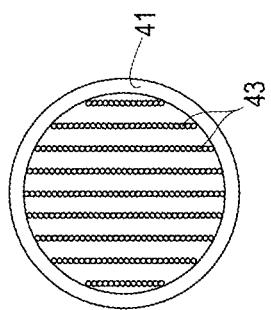

32. The mercury capture system 100 of any one of embodiments 2 to 31, wherein each of the one or more baffle assemblies 40 comprises at least one pair of baffle sheets 41 separated from one another by at least one baffle spacer 42. As shown in FIGS. 5A-5B, each baffle sheet 41 comprises holes 43 extending through a given baffle sheet 41. Typically, each baffle sheet 41 comprises rows of aligned holes 43 extending through a given baffle sheet 41 as shown in FIGS. 5A-5B.

33. The mercury capture system 100 of any one of embodiments 2 to 32, wherein each of the one or more baffle assemblies 40 comprises at least one pair of baffle sheets 41 separated from one another by two baffle spacers 42.

34. The mercury capture system 100 of embodiment 32 or 33, wherein holes 43 in the baffle sheets 41 within a given pair of baffle sheets 41 are offset from one another so as to force a curved fluid flow through each of the one or more baffle assemblies 40. See, for example, FIGS. 7A-7B.

35. The mercury capture system 100 of any one of embodiments 32 to 34, wherein each baffle sheet 41 and each baffle spacer 42 independently comprises an acrylic material.

36. The mercury capture system 100 of any one of embodiments 1 to 35, wherein the at least one conduit 10 comprises a polyvinyl chloride material, an aluminum material, a steel material, an acrylic material, a polymeric material, a plastic material, or any combination thereof.

37. The mercury capture system 100 of any one of embodiments 1 to 36, wherein the mercury capture system 100 reduces an amount of mercury within the first outlet fluid passing through the at least one conduit 10 from proximate the mercury vapor source 11 and exiting the first outlet 12 of said mercury capture system 100 to a level of less than about 35,000 $ng/m^3$ of first outlet fluid.

38. The mercury capture system 100 of any one of embodiments 1 to 37, wherein the mercury capture system 100 reduces an amount of mercury within the first outlet fluid passing through the at least one conduit 10 from proximate the mercury vapor source 11 and exiting the first outlet 12 of said mercury capture system 100 to a level of less than about 30,000 $ng/m^3$ of first outlet fluid.

39. The mercury capture system 100 of any one of embodiments 1 to 38, wherein the mercury capture system 100 captures at least 85.0 weight percent (wt %) of the mercury initially present in an amalgam 11 processed using the mercury capture system 100.

40. The mercury capture system 100 of any one of embodiments 1 to 39, wherein the mercury capture system 100 captures from about 85.0 wt % to about 98.0 wt % of the mercury initially present in an amalgam 11 processed using the mercury capture system 100.

41. The mercury capture system 100 of any one of embodiments 1 to 40, wherein the mercury capture system 100 has an overall height $H_{MCS}$ of less than about 10.0 feet (ft), an overall length $L_{MCS}$ of less than about 12.0 ft, and an overall width $W_{MCS}$ of less than about 4.0 ft. See, for example, FIGS. 17 and 19.

42. The mercury capture system 100 of any one of embodiments 1 to 41, wherein the mercury capture system 100 has an overall height $H_{MCS}$ ranging from about 4.0 ft to about 8.0 ft, an overall length $L_{MCS}$ ranging from about 4.0 ft to about 8.0 ft, and an overall width $W_{MCS}$ ranging from about 1.0 ft to about 2.0 ft.

43. The mercury capture system 100 of any one of embodiments 1 to 42, wherein the mercury capture system 100 further comprises a room exhaust fan system (not shown) in a ceiling area of a room 50 in which the mercury capture system 100 is at least partially (or completely) positioned.

44. The mercury capture system 100 of any one of embodiments 1 to 43, wherein the mercury capture system 100 further comprises a cyanide treatment pit 51 in a room 50 in which the mercury capture system 100 is at least partially (or completely) positioned.

Methods of Making Mercury Capture Systems

45. A method of making the mercury capture system 100 of any one of embodiments 1 to 44, said method comprising: forming the at least one conduit 10; positioning a fan 13 at the first outlet 12 of the mercury capture system 100; and positioning a mercury vapor collecting vessel 14 (i) between and (ii) in fluid communication with the mercury vapor source 11 and the first outlet 12 of the mercury capture system 100.

46. The method of embodiment 45, wherein said forming step comprising one or more of: (i) the mercury scrubber section 10a, (ii) the middle connecting section 10b, and (iii) the furnace section 10c.

47. The method of embodiment 45 or 46, wherein said forming step comprising forming the mercury scrubber section 10a using one or more PVA pipe pieces 61, one or more PVC couplings 62, PVC glue (not shown), one or more baffle assemblies 40, acrylic glue (not shown), or any combination thereof. See, for example, exemplary mercury scrubber section 10a shown in FIG. 4.

48. The method of any one of embodiments 45 to 47, wherein said forming step comprising forming the middle connecting section 10b using one or more sheets of metal 70, one or more sheets of aluminum (not shown), one or more sheets of steel 70, one or more baffle plates 26, one or more baffle boxes 25, one or more L-brackets 71, or any combination thereof. See, for example, FIGS. 12-17.

49. The method of any one of embodiments 45 to 48, wherein said forming step comprising forming the furnace section 10c using one or more sheets of metal 70, one or more sheets of aluminum (not shown), one or more sheets of steel 70, one or more cutters (not shown) for cutting a furnace inlet 20 into a side wall 21 of the furnace section 10c, or any combination thereof. See, for example, FIGS. 8-10, which depict exemplary components for forming furnace section 10c, namely, a lower furnace portion 74 (FIG. 8), a furnace bottom plate portion 75 (FIG. 9), and a furnace cone sheet portion 76 (FIG. 10) for forming a reduced diameter section 22 of furnace section 10*c*.

50. The method of any one of embodiments 45 to 48, further comprising: assembling (i) the furnace section 10*c*, (ii) the middle connecting section 10*b*, and (iii) the mercury scrubber section 10*a* together, in order, to form the forming the at least one conduit 10, and positioning the fan 13 at an outlet 24 of the mercury scrubber section 10*a*, the outlet 24 of the mercury scrubber section 10*a* being the first outlet 12 of the mercury capture system 100.

Methods of Using Mercury Capture Systems

51. A method of using the mercury capture system 100 of any one of embodiments 1 to 44, said method comprising: positioning the mercury capture system 100 near a mercury vapor source 11; and cutting on the fan 13.

52. The method of embodiment 51, further comprising: collecting mercury from the first outlet fluid passing through the at least one conduit 10 from proximate the mercury vapor source 11 and exiting the first outlet 12 of the mercury capture system 100 in the mercury vapor collecting vessel 14.

53. The method of embodiment 51 or 52, wherein said positioning step comprises positioning the mercury capture system 100 within a gold shop (not shown).

54. The method of embodiment 51 or 52, wherein said positioning step comprises positioning the mercury capture system 100 at an amalgam processing facility 90. See, FIG. 19.

55. The method of embodiment 54, wherein the amalgam processing facility 90 is near a mining operation (not shown).

56. The method of any one of embodiments 51 to 55, further comprising: heating an amalgam composition 11 containing mercury so as to form the mercury vapor source 11.

57. The method of embodiment 56, wherein the amalgam composition 11 comprises gold or silver.

58. The method of any one of embodiments 51 to 57, further comprising: measuring an amount of mercury within the first outlet fluid exiting the first outlet 12 of the mercury capture system 100.

It should be understood that although the above-described mercury capture systems, and methods are described as "comprising" one or more components or steps, the above-described compositions, and methods may "comprise," "consists of," or "consist essentially of" any of the above-described components or steps of the compositions, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a mercury capture system and/or method that "comprises" a list of elements (e.g., components or steps) is not necessarily limited to only those elements (or components or steps), but may include other elements (or components or steps) not expressly listed or inherent to the mercury capture system and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a mercury capture system and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described mercury capture systems, and methods may comprise, consist essentially of, or consist of any of the herein-described components and features, as shown in the figures with or without any feature(s) not shown in the figures. In other words, in some embodiments, the mercury capture systems and/or methods of the present invention do not have any additional features other than those shown in the figures, and such additional features, not shown in the figures, are specifically excluded from the mercury capture systems and/or methods. In other embodiments, the mercury capture systems and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Mercury capture systems as described in embodiments 1 to 58 and as shown in the figures were prepared.

Example 1

Figure 6:
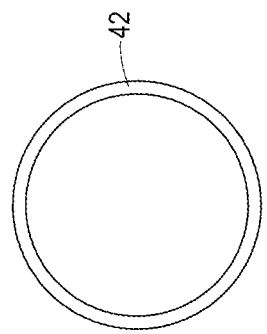
FIG. 6 depicts an exemplary baffle spacer design suitable for use in stage 3 of the exemplary mercury capture system and method shown in FIG. 1.
Figure 7A:
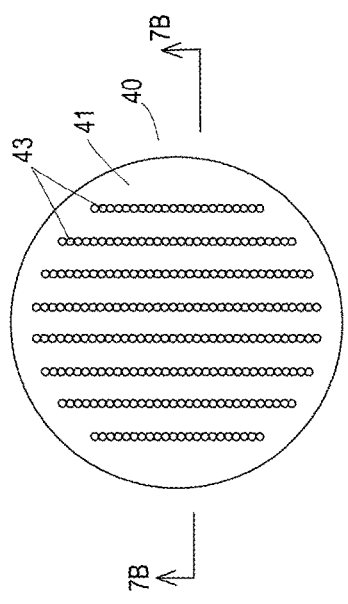
FIG. 7A depicts an exemplary baffle assembly showing a baffle sheet overlay design suitable for use in baffle assemblies of the exemplary mercury capture system and method shown in FIG. 1.
Figure 7B:
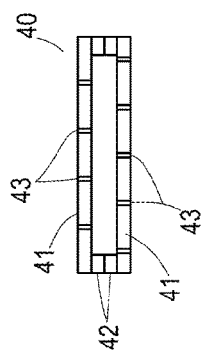
FIG. 7B depicts a cross-sectional view of the exemplary baffle assembly shown in FIG. 7A as viewed along line 7B-7B shown in FIG. 7A.
Figure 8:
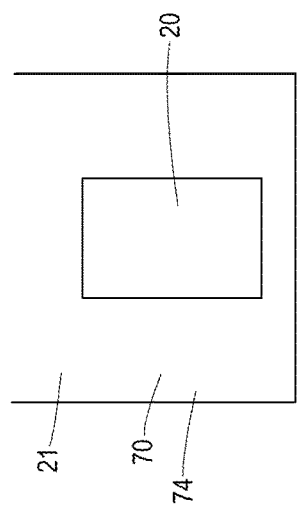
FIG. 8 depicts an exemplary furnace component design for a cylindrical furnace component suitable for use in stage 1 of the exemplary mercury capture system and method shown in FIG. 1.

The following exemplary mercury capture system was prepared and tested:

Parts List (Mercury Capture System Column)
1-500 mL Nalgene bottle
1-2.5" section of ¾" PVC pipe
1-2"×¾" PVC Adapter
1-2" Porcelain Funnel
1-4"×2" PVC Drain Adapter
1-4" section of 4" PVC Pipe
1-6"×4" PVC drain Adapter
1-5" section of 6" PVC Pipe
1-6" PVC WYE coupling
2-6" Rubber Couplings
2-24" section of 6" PVC Pipe
1-6" PVC fan Baffle Design and Method of Making 1. Using an appropriate design software, draw the two schematics seen in FIGS. 5A and 5B. (Note that the inner dashed circle is a simple boundary for the baffle holes so that the baffles could still have stability and provide space for spacers.)
2. When the drawing is complete, copy and paste the two designs so that six baffles, three of each type, can fit on one 12"×24" acrylic sheet.
3. Laser cut the sheet.
4. Using the same software in step 1, draw baffle spacers such as shown in FIG. 6. These will be the spacers between the baffles.
5. When the drawing is complete, laser cut the baffle spacers out of another 12"×24" acrylic sheet.
6. Once all of the baffles and spacers are cut out, glue two baffles with two spacers in between using acrylic glue. The baffles should be offset so that there is no clear path for flow. An example of this can be seen in FIG. 7.
7. Continue this process until you have six baffles glued together. There should be no spacers above or below the newly glued baffle column.

Exemplary Mercury Capture Column and Method of Making

Figure 4:
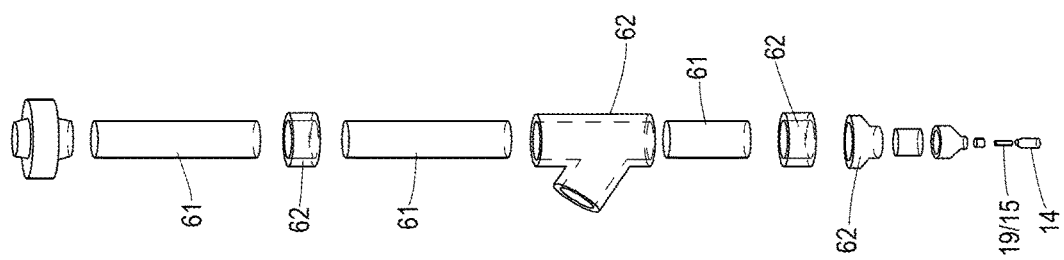
FIG. 4 depicts an exemplary mercury scrubber suitable for use in stage 3 of the exemplary mercury capture system and method shown in FIG. 1.

Exemplary mercury capture column shown in FIG. 4 was prepared as follows.

1. Obtain the Nalgene bottle and remove the lid.
2. Carefully drill a 1" hole into the center of the lid.
3. Sand the edge of the hole until a ¾" PVC pipe fits snuggly inside.
4. Insert the ¾" PVC pipe into the top of the lid so that ¼" of the pipe goes out of the other side.
5. Obtain the epoxy and mix it onto a plate.
6. Using the epoxy, seal the top of the lid with the pipe in it.
7. Once the epoxy dries, turn the pipe and lid upside down.
8. Seal the bottom of the lid using the epoxy, being careful not to get epoxy on the threads of the lid.
9. Set the lid and PVC aside and allow to dry.
10. Obtain the 2"×¾" pressure reducer and the 2" funnel and insert the funnel into the reducer.
11. Mix up a quarter size amount of epoxy onto a plate.
12. Apply the epoxy to the top of the funnel sealing the funnel to the reducer.
13. Obtain and insert the ¾"×2" pressure reducer into the 4"×2" drain reducer.
14. Attach the 3¾" section of 4" pipe to the other end of the drain reducer.
15. Using the opposite end of the 4" pipe, attach it to one end of the 4"×6" drain reducer.
16. Insert the other end of the 4"×6" drain reducer into the 6" PVC coupling.
17. Insert the 8" section of 6" PVC pipe into the open side of the 6" PVC coupling.
18. Using the other end of the 8" section of PVC pipe, insert it into the bottom part of the wye coupling.
19. Insert a 1' section of 6" PVC pipe into the top of the wye coupling.
20. Loosen the metal belts on a 6" rubber coupling
21. Slide a loosened 6" rubber coupling halfway onto the other end of the 1' section of PVC
22. Tighten the bottom belt to firmly attach the coupling to the pipe.
23. Take the 1' section of 2" PVC pipe to the vertical bandsaw.
24. Using the bandsaw, cut out four ¼" thick, 2" long strips from the PVC pipe.
25. Sand the four pieces so that they are smooth and circular (these are PVC nails).
26. Drill four holes equal-distance from each other 3" from the bottom of the last 1' section of 6" PVC pipe.
27. One at a time, coat the circular pieces of PVC (i.e., the PVC nails) in PVC glue and hammer it into the hole.
28. Set aside and allow to dry.
29. Once dry, cut off any excess material from the outside and sand to make smooth.
30. Insert the pipe into the top of the 6" rubber coupling such that the PVC nails are on the bottom.
31. Tighten the metal belt.
32. Insert the baffles into the PVCC section so they sit on the PVC nails.
33. Attach a 6" rubber coupling to the top of the PVC section.
34. Place the 6" PVC fan into the top of the rubber coupling.
35. Tighten the metal belt onto the PVC fan.

Exemplary Furnace and Method of Making

Exemplary mercury capture column shown in FIGS. 8-11 was prepared as follows.

Figure 9:
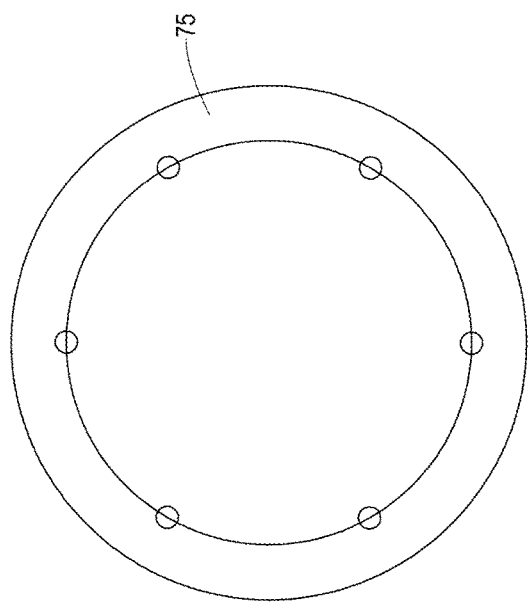
FIG. 9 depicts an exemplary bottom furnace component suitable for use in stage 1 of the exemplary mercury capture system and method shown in FIG. 1.
Figure 10:
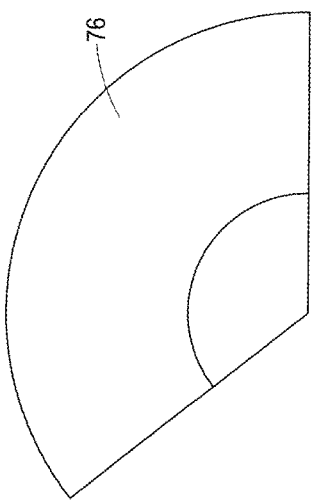
FIG. 10 depicts an exemplary cone component design for a conical furnace component suitable for use in stage 1 of the exemplary mercury capture system and method shown in FIG. 1.

1. Obtain or cut out a ⅛" thick 120×110 cm stainless steel sheet.
2. Roll the sheet into a cylinder with a diameter of 38 cm then weld the seam.
3. 4 cm from the bottom of the cylinder, cut out a rectangle that is 14 cm wide and 21 cm high. This will be the face of the furnace as seen below in FIG. 8.
4. Cut out a 38 cm diameter circle from another piece of ⅛" thick stainless steel sheet.
5. On the 38 cm diameter circle, draw a 30 cm circle in the center of the stainless steel piece.
6. Along the circle, drill six ⅝" holes placed 60° apart from one another as seen in FIG. 9.
7. Place the 38 cm diameter steel piece onto the bottom of the cylinder being sure to line up one of the drilled holes up with the face of the cylinder.
8. Weld the cylinder and the plate together 9. On a stainless steel sheet, draw and cut out the sketch shown in FIG. 10 on the sheet.
10. Using the cut out piece, use the metal bending machine to connect the sides and form a cone.
11. Weld along the seams.
12. Next, place the cone on top of the previously made cylinder with the 15 cm diameter part facing up.
13. Weld the cone into place.

Exemplary Furnace Table

1. Have a blacksmith build a 45 cm tall×48 cm long×48 cm wide metal table.
2. Using the same template that was used for the bottom of the furnace, as shown in FIG. 9, drill holes into the top of the table.
3. Acquire three 3"×⅝" bolts and three ⅝" nuts.
4. Fasten the furnace to the table with the nuts and bolts being sure to rotate the furnace to the desired orientation.

Exemplary Middle Connecting Section

Figure 11:
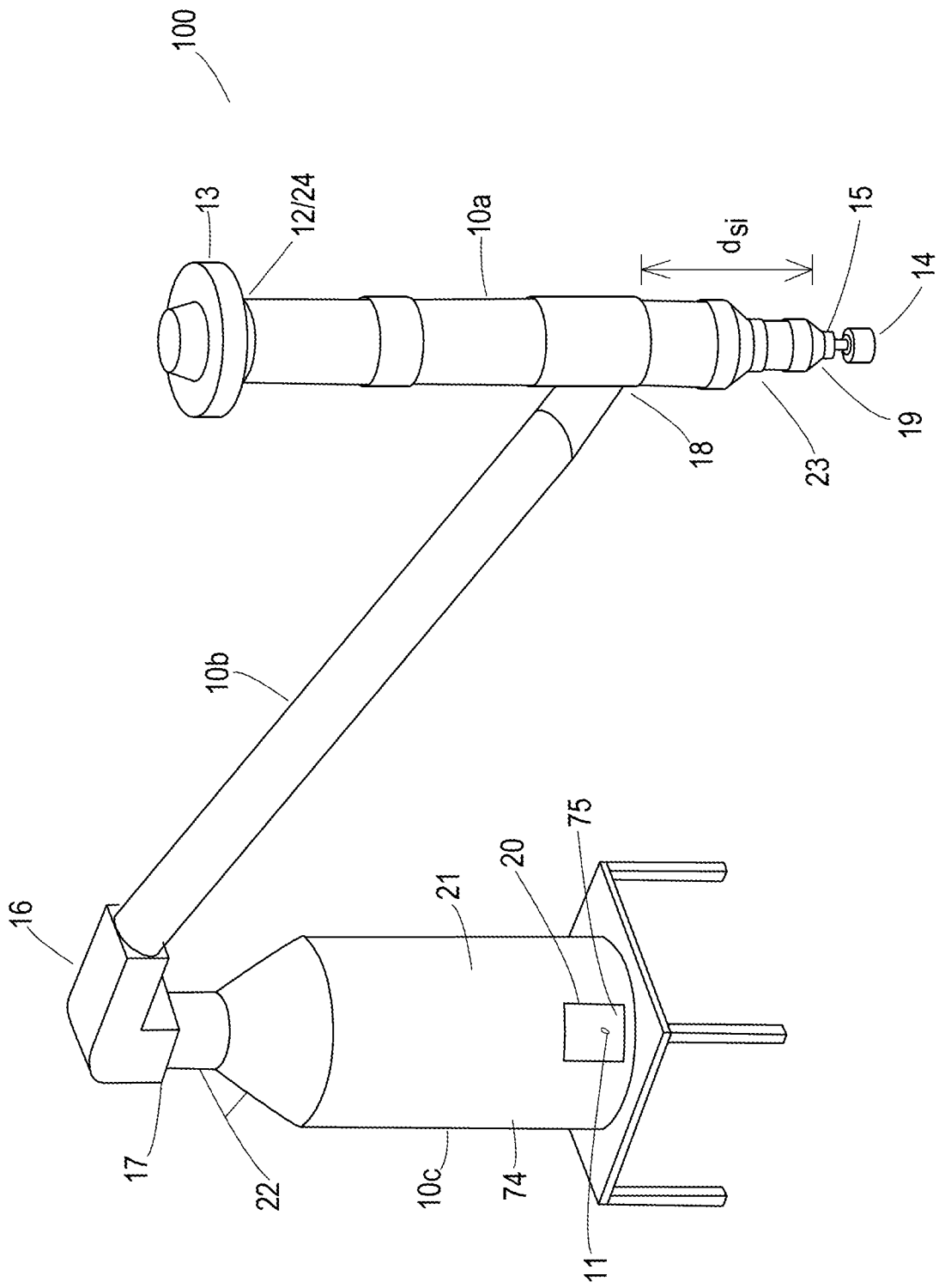
FIG. 11 depicts an exemplary mercury capture system suitable for use in a gold shop, the exemplary mercury capture system being designed to perform the exemplary mercury capture method shown in FIG. 1.

For the design that was to be used within a gold shop, temperatures were not going to be as great as they were when the device was in the processing plant. Due to gold shops being so different, depending on which one you go to, this design can be built on a case by case basis because it might have to go out a window, the ceilings might be low in the room, and many other factors that limit the construction of the device. Below, the simplest form of this design is shown in FIG. 11. The pipe can be made out of 6" PVC pipe or made from rolled stainless steel depending on how long the burn times are.

Exemplary Plates and Method of Making

These plates are to be placed inside of a baffle box that will be discussed below. The purpose of the plates is to increase impaction opportunities while also increasing the coalescence of particles.

Figure 12:
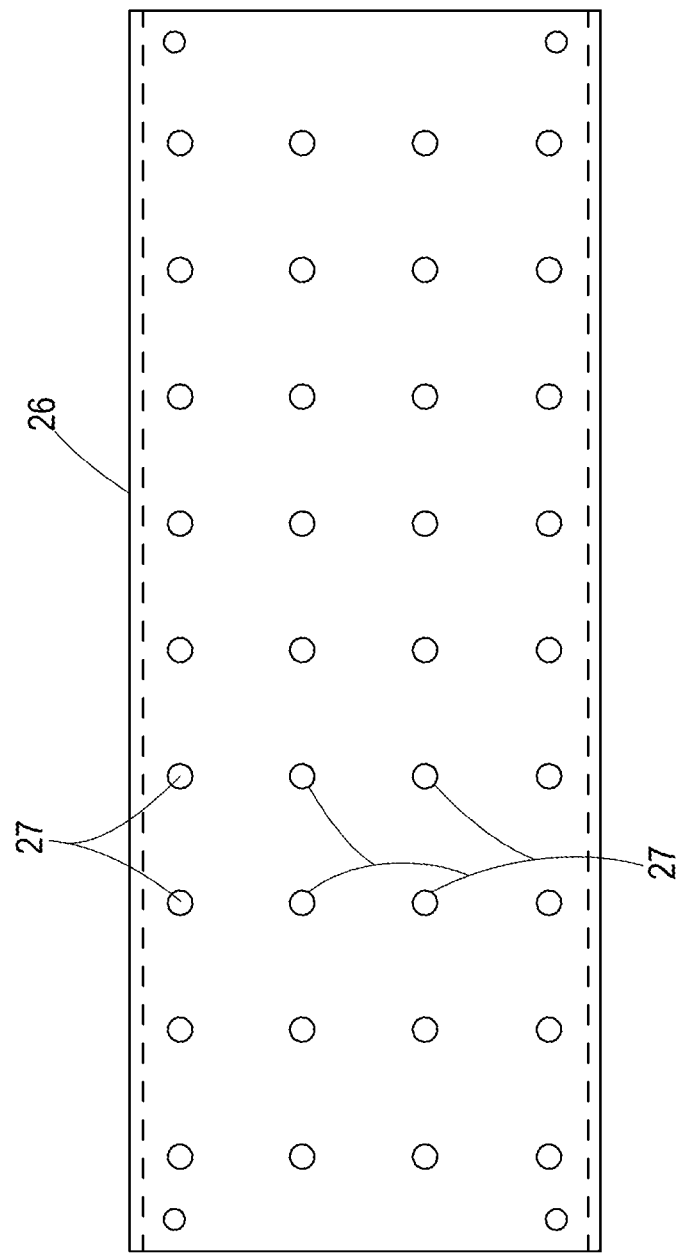
FIG. 12 depicts an exemplary baffle box plate design suitable for use in a baffle box for use in stage 2 of the exemplary mercury capture system and method shown in FIG. 1.
Figure 13:
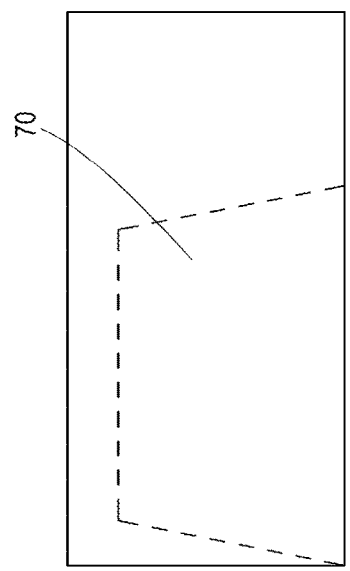
FIG. 13 depicts an exemplary baffle box design suitable for use in forming a baffle box suitable for use in stage 2 of the exemplary mercury capture system and method shown in FIG. 1.

Use the design in FIG. 12 as a guide to complete the following instructions.

1. Using a stainless steel sheet that is 98×38 cm bend up 1 cm along the 98 cm sides, making the sheet 98×36 cm. Repeat for the second sheet.
2. Draw a grid onto each sheet as shown in FIG. 12.
3. Using a drill press, drill a 2 cm diameter hole at the points of intersection within the grid.
4. Drill a ⅝" hole into each corner of the plates as shown in FIG. 12.
5. Place the plates on top of each other with the bent edges facing up, being sure to rotate one of the plates 180 degrees so that the baffle holes do not line up perfectly.
6. Insert a ⅝" threaded rod into each of the four ⅝" holes being sure to use two nuts as spacers to form a 1" gap between each plate.
7. Tighten down the plates by placing ⅝" nuts onto both ends of the rods.

Exemplary Baffle Box and Method of Making

The baffle box was designed to increase retention time of the device, and to act as a heat sink. The longer retention time a device has, the more time the mercury particles will have to come together. With the baffle box and baffles together, this is somewhat of a pretreatment device due to there being five times more mercury than what would be at a gold shop.

Figure 14:
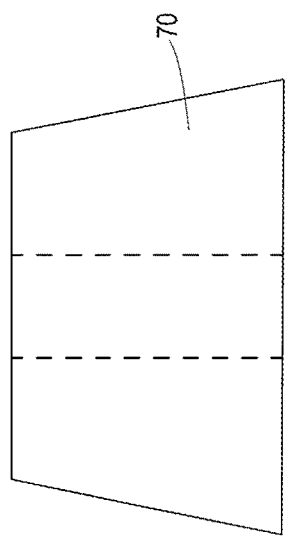
FIG. 14 depicts exemplary bending instructions for the baffle box design shown in FIG. 13.
Figure 15:
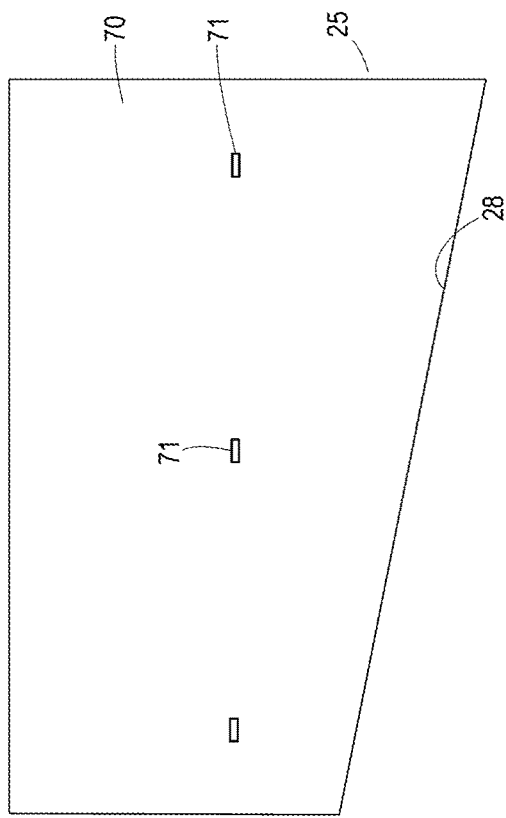
FIG. 15 depicts an exemplary L-bracket configuration for forming a L-bracket suitable for use in forming a baffle box suitable for use in stage 2 of the exemplary mercury capture system and method shown in FIG. 1.
Figure 16:
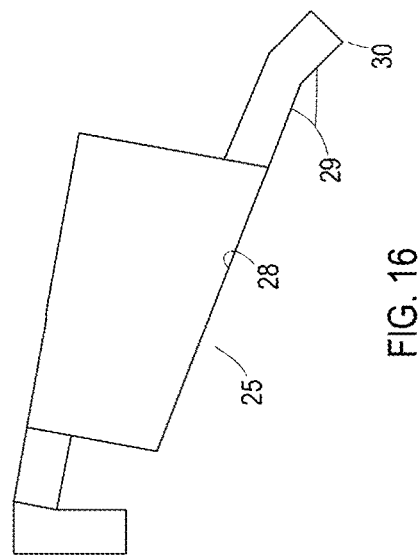
FIG. 16 depicts an exemplary middle section with inlet and outlet suitable for use in forming a baffle box suitable for use in stage 2 of the exemplary mercury capture system and method shown in FIG. 1.

1. On a 4'×8' stainless steel sheet, draw and cut the sketch shown in FIG. 13.
2. On the side that is 128 cm long, mark at 45 cm from each end.
3. On the side that is 168 cm long, mark at 65 cm from each side.
4. Using a straightedge, draw a line connecting the marks directly across from each other.
5. Bend along each line to make a 90° angle as shown in FIG. 14.
6. Acquire six stainless steel L-brackets 7.5 cm long and 2.5 cm along bends of the L shape.
7. Weld each of the exemplary L brackets, as shown in FIG. 15, on the inside of the baffle box.
8. Place the baffle plates on top of the brackets and weld them to each other.
9. Seal the bottom of the baffle box by welding on a 122 cm×38 cm steel sheet.
10. Next the baffle box will be sealed based off of the design shown in FIG. 16.
11. Be sure that at both the entrance to and exit from the baffle box there are no jagged edges or dead zones that could create pooling.
12. An example of how to eliminate jagged edges or dead zones can be seen in the final assembly in FIG. 17, namely, having a continuous slope downward through the baffle box
13. To decrease the possibility of pooling at the effluent of the baffle box, a spigot (not shown) could be added as well.

Exemplary Final Assembly and Method of Making

1. Place the furnace in the desired location, most likely in the corner of a room with the exhaust going parallel with the wall.

2. Connect the middle connecting section, let it be the baffle box or the PVC pipe, to the furnaces exhaust pipe. Have a Y-support beam built by a blacksmith in order to support the middle connecting section.
3. Place the Y beam into the appropriate position. Have a small table built (i.e., by a blacksmith) with a hole in the center of it so that the mercury capture column can be inserted into it with the mercury capture bottle at least six inches off the ground. The table will need to be built according to the desired location so that the system will be supported properly.
4. Connect the finished mercury capture column to the outlet of the middle connecting section. Be sure to place the table underneath the capture column for support after the connection is made.

Impaction Theory:

The primary means of mercury capture in the above-described system is due to impaction theory. Impaction theory is the idea that, as the flow of particles is diverted around an object or around a bend, the larger particles will continue on their original path, due to inertia, and impact onto the surface in that path. This theory is being utilized with the baffle plates within both the baffle box and the mercury impaction device.

In order to utilize this theory, there are several equations and laws that must be known and understood. The Reynolds number is a number that represents how turbulent or laminar the flow is. The equation can be seen below in equation 1 below where $\rho_g$ is gas density, V is gas velocity, $d_p$ is aerosol diameter, and $\eta$ is gas viscosity.

Reynolds number  Equation 1

$$Re_p = \frac{\rho_g * V * d_p}{\eta}.$$

A Reynolds number greater than 1000 is turbulent and a Reynolds number less than 1 is laminar. Any number between 1 and 1000 is classified as a transfer regime.

The Reynolds number is useful in this case to determine if the flow is laminar. In the case of the mercury impaction device, it is best if the flow is laminar so that the particles can follow a set path where inertia can take a greater role.

In order to determine the size particles that will be captured based off of the baffles created, Stokes law can be utilized. Stokes law can be seen below in equation 2 where $\rho_p$ is particle density, $d_p$ is particle diameter, U is flow velocity, $\eta$ is air viscosity, $D_j$ is nozzle diameter.

Stokes Equation  Equation 2

$$Stk = \frac{\tau U}{D_j/2} = \frac{\rho_p d_p^2 U C_t}{9\eta D_j}.$$

Figure 18:
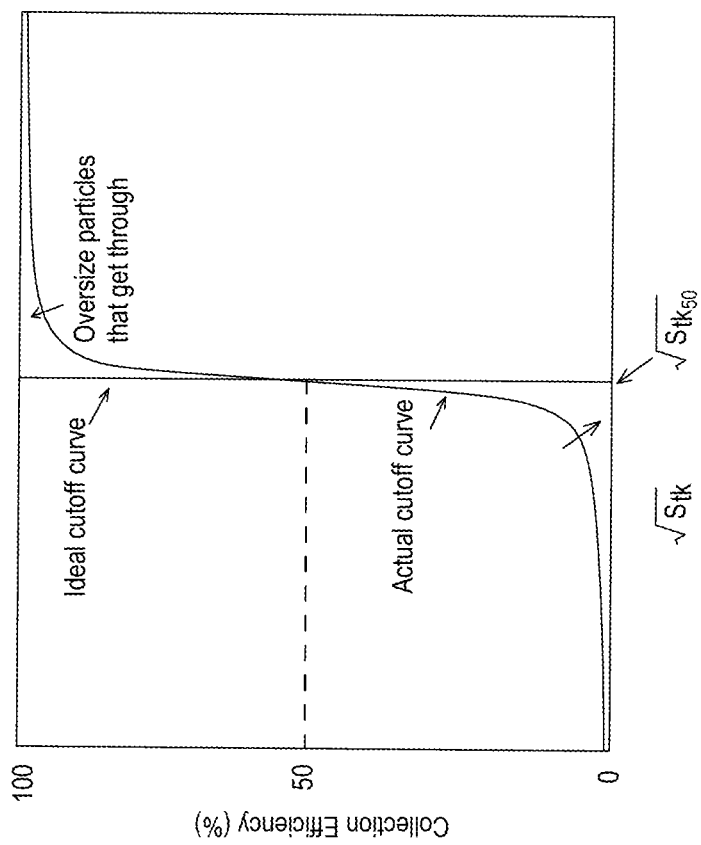
FIG. 18 depicts ideal and example impaction cutoff curves.
Figure 19:
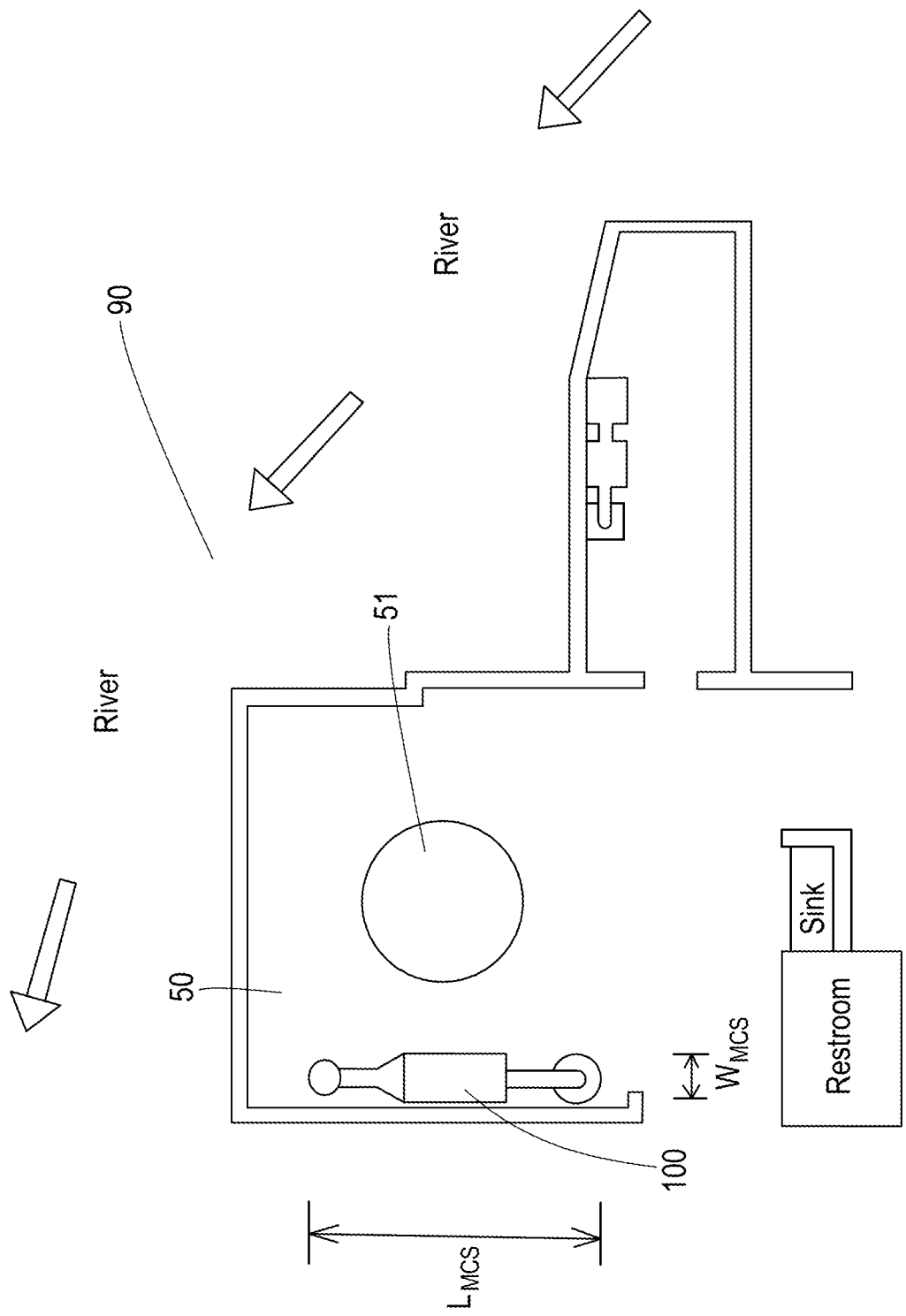
FIG. 19 depicts an exemplary processing plant layout designed to perform the exemplary mercury capture method shown in FIG. 1.

The Stokes equation can then be used to create a collection efficiency graph as shown in FIG. 18. From this graph, a clear particle cut off can be obtained, also known as $d_{p50}$. In an ideal scenario, any particle size above the $d_{p50}$ is captured, while any size below the $d_{p50}$ is not. However, this is not an ideal world and this is not always the case, but it is a good estimate.

In order to create the ideal baffle design, the Stokes equation can be used to determine the best jet size based off of the desired size of particle that is wished to be caught.

Calculations:

Flow Rates

Flow rates were calculated using the exit velocity of the fan multiplied by the surface area of the fan. This can be seen in equation 3 where Q is the flow rate, V is the face velocity, and A is the surface area.

$$Q = V * A \qquad \text{Equation 3: Flow rate.}$$

The exit velocity of the air leaving the fan was measured with a handheld anemometer. This was done by taking two different measurements. One at the center of the fan, and one on the outer portion of the fan, due to the velocities varying so much from one to the other. Once these measurements were taken, the surface area was calculated for the inner circle, then that number was subtracted from the total area of the fan to get the area of the outer circle. A final equation for the flow rate was a modified version and can be seen below in equation 4. Where Qt is the total flow rate, V1 is the inner velocity, A1 is the inner area, V2 is the outer velocity, and At is the total area.

$$Qt = (71 * A1) + (V2 * (At - A1)) \qquad \text{Equation 4: Modified flow rate.}$$

This was done in order to find the flow rates of the device at different settings of the fan so that the optimal speed could be set on the power regulator.

Face Velocity

The theoretical face velocity was calculated from the flow rates that were measured. Then rearranging equation 4 to solve for V and using the area of the face, one can calculate the theoretical face velocity. This was compared to the actual face velocity measured using the anemometer at the face of the furnace. This was necessary because the velocity had to be above 0.4 m/s or 72 fpm based on OSHA standards. This prevents the mercury fumes from flowing back into the room that the furnace is in. This was also measured at each individual speed setting to ensure that any setting that the device was set on would be safe for use. The theoretical and actual face velocities were within 0.05 m/s but all were above 0.4 m/s.

Retention Time

Retention time was calculated using equation 5 below where T is the retention time V is the volume and Q is the previously measured flow rate.

$$T = V/Q \qquad \text{Equation 5: Retention time.}$$

The retention time is important because it determines the size that the particles will be when they are in the impaction part of the device. The longer the retention time, the longer time the particles have to coalesce and become larger, therefore easier to be impacted.

The retention time was also tested by having the fan running with a particle counter at the top. Once the fan was up to speed, a puff of smoke was released at the face of the furnace. The particle counter would then detect the smoke once it had made its way through the entire device. The time would be measured on a stopwatch. The theoretical and actual retention time were within 1 s of each other.

Figure 17:
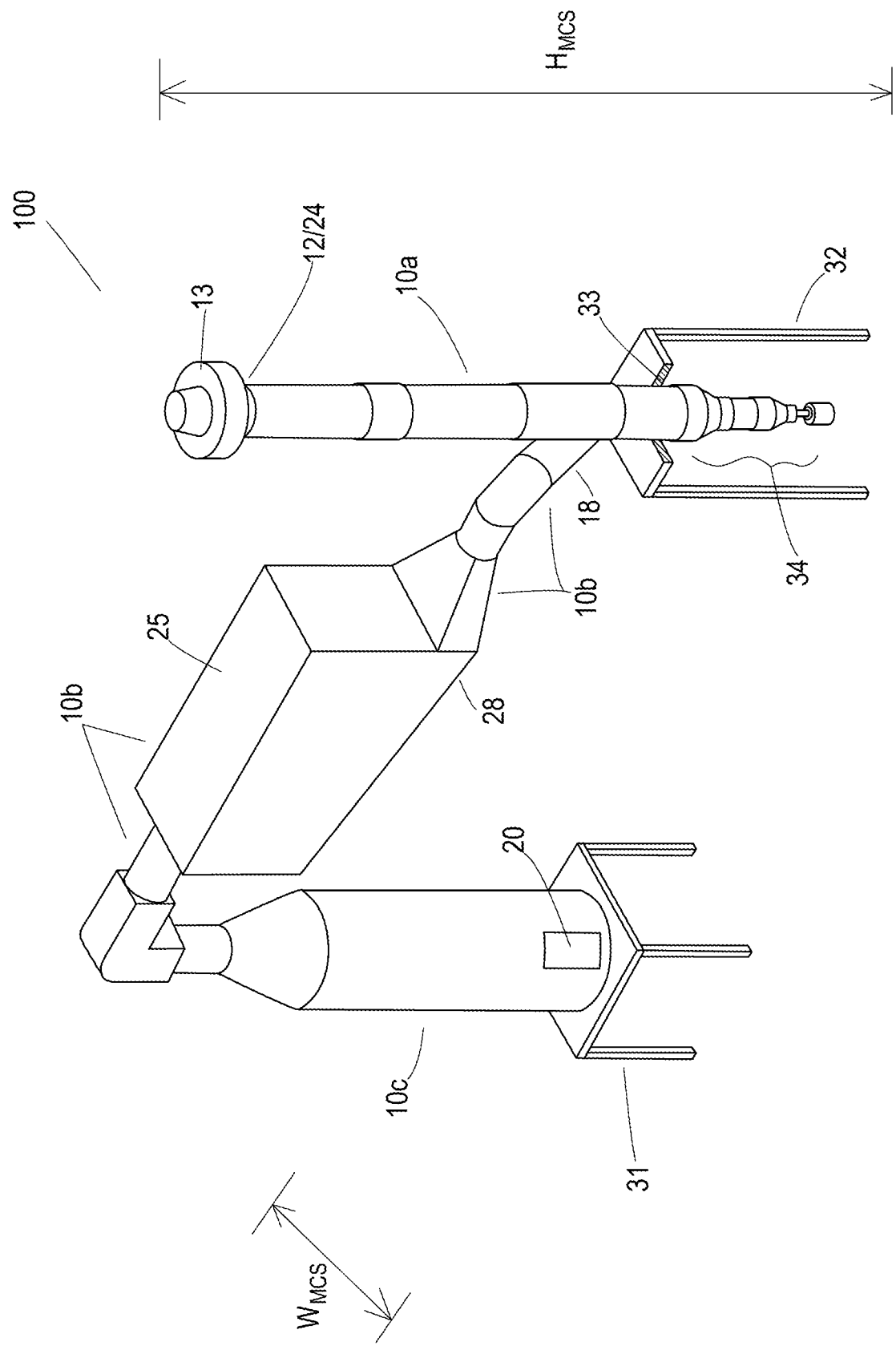
FIG. 17 depicts an exemplary mercury capture system, the exemplary mercury capture system being designed to perform the exemplary mercury capture method shown in FIG. 1.

Recommended Operating Procedure:

Below are recommended instructions on how to properly and safely operate either of the exemplary mercury capture devices shown in FIGS. 11 and 17.

1. Don your respirator and put your hard hat on.
2. It is important to do step 1 first because even if the system is not running, it is still a contaminated area and may pose health hazards.
3. Turn the fan on.
4. With tongs, insert the amalgam onto the plate within the furnace.
5. Move the blowtorch to the appropriate position in front of the face of the furnace.
6. Turn the blowtorch on.
7. Allow the amalgam to burn for the appropriate time to burn off the mercury.
8. Once the amalgam has burned for a sufficient amount of time, turn the blow torch off and leave the amalgam within the furnace.
9. The amalgam needs to be left within the furnace to allow the excess mercury to evaporate off safely within the closed ventilated system.
10. Once it appears there is no longer mercury being evaporated off of the amalgam, use the tongs to move the product to the desired area.
11. Allow the fan to run for 10-20 minutes more to allow the particles of mercury to flow through the capture device.
12. Turn the fan off after the time has passed.

Through the use of MT 3000 it was calculated that the above-described mercury capture systems had an 85-90% removal efficiency when compared to an open air mercury burn.

Example 2

Another mercury capture system (MCS), similar to the above-described MCS of Example 1, was tested and evaluated to determine its effectiveness in capturing mercury. The system had a retention time of 14 seconds and a facial velocity of 4.4 m/s. The exhaust temperature never exceeded 140° C. The design was as follows:

| Stage 1 | Stage 2 | Stage 3 | Stage 4 |
|---------|---------|---------|---------|
| Propane torch, amalgam placed on firebrick | Large baffle box containing four horizontal impactors | Vertical scrubber constructed of PVC with acrylic impact plates evenly spaced throughout the cooling tower | Inline PVC fan controlled by a rheostat |

Mercury concentrations were measured using a Mercury Instruments IP-3000 AAS and a Lumex RA-915M AAS. A test amalgam was prepared by a local miner using silver and mercury. The amalgam was heated by the miner for 18 minutes. During this time, the IP-3000 measured the concentrations of the air in front of the burning amalgam to not exceed 30,000 ng/m$^3$. The only time levels exceeded this value was when the miner adjusted the amalgam disrupting the air flow, causing readings to exceed 2,000,000 ng/m$^3$ from >10 ft away. During this time, there was no change in concentration from 50 ft away downwind (<100 ng/m$^3$).

Further testing included inductive and conductive heating of the amalgam in Stage 1, and the use of three cyclone-shaped heat exchangers operating in series as well as a new baffle box design constructed and tested for Stage 2. In Stage 3, mercury aerosols were removed using a series of impaction plates. PVC fans were utilized as the fan for Stage 4.

Example 3

Figure 20:
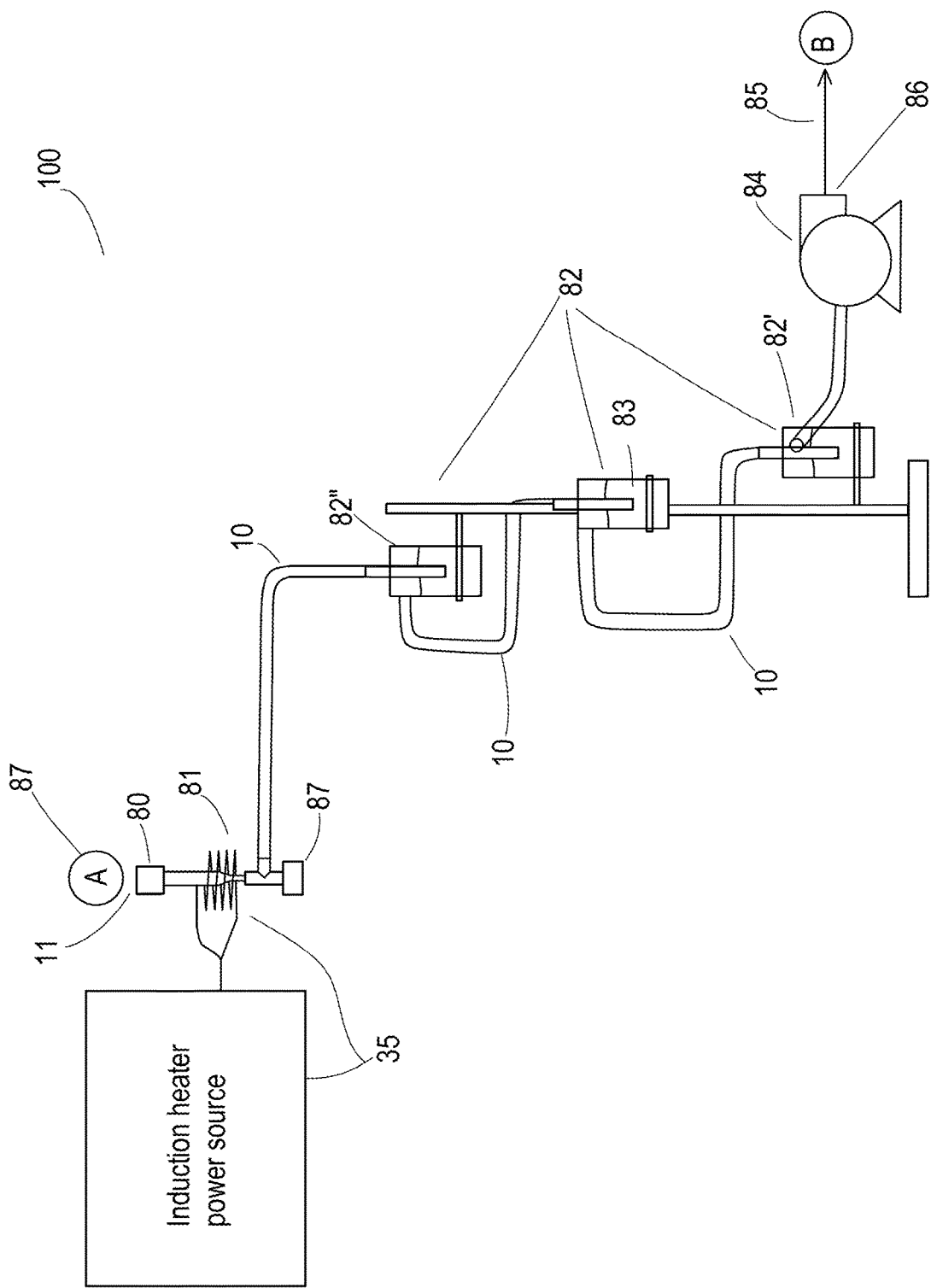
FIG. 20 depicts another exemplary mercury capture system, the exemplary mercury capture system being designed to perform the exemplary mercury capture method shown in FIG. 1.

A system 100 as shown in FIG. 20 was tested as follows. A glass, fritted funnel 80 was connected to a series of three, 500-milliliter suction bottles 82 in series with valves 87 at opposite ends of funnel 80. The suction bottles 82 were filled with about 300 mL of H$_2$O 83. The terminal bottle 82' was connected to a PTFE diaphragm vacuum pump 84. A piece of sponge gold (estimated 5% Hg° by weight) (not shown) was placed in the fritted funnel 80. Prior to the assessment, this sponge gold registered about 1,000 ng/m³ using a Lumex RA-915M spectrophotometer (not shown).

The Lumex, induction heating system 35, funnel 80, and suction bottles 82 were all located within a fume hood (not shown) that was noted to have a background Hg° concentration of 10 ng/m³. The vacuum pump 84 was turned on, and the exhaust 85 from the pump 84 was determined to contain about 10 ng/m³ as measured by a Lumex RA-915M.

The frit and sponge gold (not shown) were placed in an Across 1H15A 30-80 KHz 15 KW 220V Midfrequency Compact Induction Heater 35. The heater was set to 500 amps, and heating commenced. Within 10 seconds, the sponge gold was glowing red. Mercury concentrations at the opening of the frit (i.e., location labeled A in FIG. 20) and the exhaust 85 of the pump 84 (i.e., location labeled B in FIG. 20) never exceeded 30 ng/m³ and 800 ng/m³ respectively as measured using a Lumex RA-915M atomic absorbance spectrometer.

After 5 minutes of intermittent heating, the sponge gold was cooled to room temperature. The gold was removed from the fume hood and examined using a Lumex RA-915M AAS. No Hg° was measured above ambient concentrations.

Example 4

A 1.7534 g amalgam (not shown) procured in an Ecuadorian ASGM village was heated using the same system 100 as described in Example 3 and as shown in FIG. 20. In this example, the amalgam was heated intermittently over a period of 10 minutes. During this time, the Hg° concentrations never exceeded 40,000 ng/m³ and 200,000 ng/m³ as measured using a Mercury Instruments Mercury Tracker 3000 IP (not shown) at the top of the frit 80 and at the exhaust port 86 of the pump 84, respectively. Much of the liberated Hg° condensed on the surface of the frit 80 and the gold.

The gold was removed, and the mercury from the frit 80 was placed in a pre-tared vial (not shown). The resulting sponge gold was reheated to glowing red, and no additional Hg° was collected on the surface of the frit 80. At this time, it was noted that small, but visible, beads of Hg° had collected in the first of the three suction bottles 82 and in the funnel frit 80. Upon cooling, the sponge gold was determined to weigh 0.8278 g (47.21% of original), the collected Hg° was determined to weigh 0.7296 g (41.61% of original mass). The small Hg° beads in the first suction bottle 82 and funnel frit 80 were not included in this mass. This represented a recovery of 88.82% of the original mass. Assuming that water is a negligible component of the amalgam, it was assumed that Hg° was the only volatile substance associated with the amalgam. To this end, this unoptimized system 100 was able to recover greater than 78% of mercury in the amalgam for reuse.

Further analysis determined that Hg° concentration exceeded 500,000 ng/m³ in the tubing 10 between the frit 80 and the first bubbler 82″ as measured using a Mercury Instruments Mercury Tracker 3000 IP (not shown), but concentrations decreased in tubing 10 between subsequent bubblers 82. The tubing 10 connecting the MCS 100 to the pump 84 was disconnected, and concentrations of the pump exhaust 85 never exceeded 20,000 ng/m³ as measured by the Mercury Instruments Mercury Tracker 3000 IP. After 15 minutes of continuous running, exhaust concentrations were under 4,000 ng/m³.

Example 5

Figure 21:
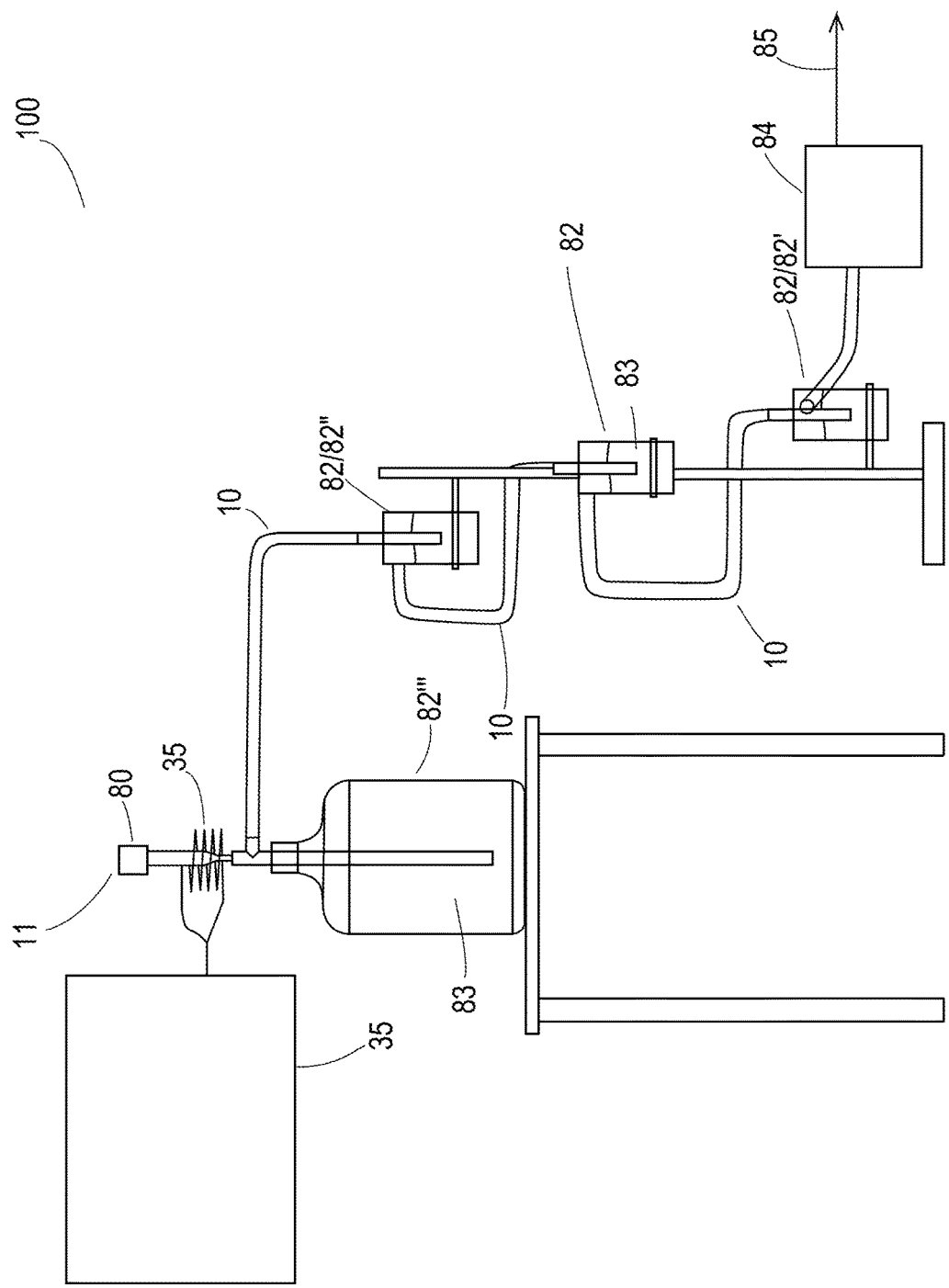
FIG. 21 depicts another exemplary mercury capture system, the exemplary mercury capture system being designed to perform the exemplary mercury capture method shown in FIG. 1.

A system 100 shown in FIG. 21 was used in a manner similar to that described in Example 4. In this system 100, effluent from the burn stage (i.e., heater 35/frit 80) first enters a large bubbler 82‴ having an approximate volume of 20 L. Once the process gas exits the first larger bubbler 82‴, it enters a series of additional 500-mL bubblers 82 (similar to those shown in FIG. 20) to capture additional Hg°.

In this example, the burn stage of the MCS 100 utilized one of several types of crucibles 36 or fritted funnels 80 to hold the amalgam or sponge gold (not shown) during the heating process. Crucible type 36 used was dependent on whether an amalgam or sponge gold was being processed, and on what heating mechanism was used. A vacuum pump 84 was used to pull gases produced during the burn stage through the mercury capture system 100.

An outflow valve on the 20-L container 82‴ was connected to a series of three, 500-mL suction bottles 82 in series. The suction bottles 82 were filled with approximately 300 mL of water 83. The terminal bottle 82′ was connected to a PTFE diaphragm vacuum pump 84. A piece of sponge gold 11 was placed on the frit 80. The frit 80 and sponge gold 11 were placed in an Across 1H15A 30-80 KHz 15 KW 220V Midfrequency Compact Induction Heater 35. The heater 35 was set to 500 amps, and heating commenced.

Within 10 seconds, the sponge gold 11 was glowing red. During testing, Hg° concentrations were determined using a Mercury Instruments Mercury Tracker 3000 IP. Initially the fritted funnel 80 was uncapped and concentrations approaching 1,000,000 ng/m³ were measured at the top opening of the funnel 80. After capping, concentrations were initially measured at 400,000 ng/m³, but rapidly decreased to less than 50,000 ng/m³ for the duration of the test.

Three additional amalgams 11 were heated using the system described above and shown in FIG. 21. The amalgams 11 were placed in an Across 1H15A 30-80 KHz 15 KW 220V Midfrequency Compact Induction Heater 35. The heater 35 was set to 500 amps, and heating commenced.

Two of the amalgams 11 were actively liberating Hg° within 5 seconds of heating, with one amalgam 11 rapidly heated and glowing red. During testing, Hg° concentrations were determined using a Mercer Instruments Mercury Tracker 3000 IP. During heating concentrations at the capped frit 80 were determined to be less than 30,000 ng/m³. Exhaust concentrations were initially measured to be up to 200,000 ng/m³, but for the duration of testing the majority of measurements were 50,000 ng/m³ or less. Upon completion of heating, Hg° was decanted from the frit 80, the gold was rinsed with water and presented to a local gold shop owner, who stated that they were "pristine."

The third amalgam 11 was introduced to the system as a slurry, with large quantities of excess Hg°. During heating, concentrations at the capped frit 80 were determined to be less than 140,000 ng/m³, with the majority of measurements recorded as less than 90 ng/m³. Exhaust concentrations did not exceed 220,000 ng/m³.

Example 6

Figure 22:
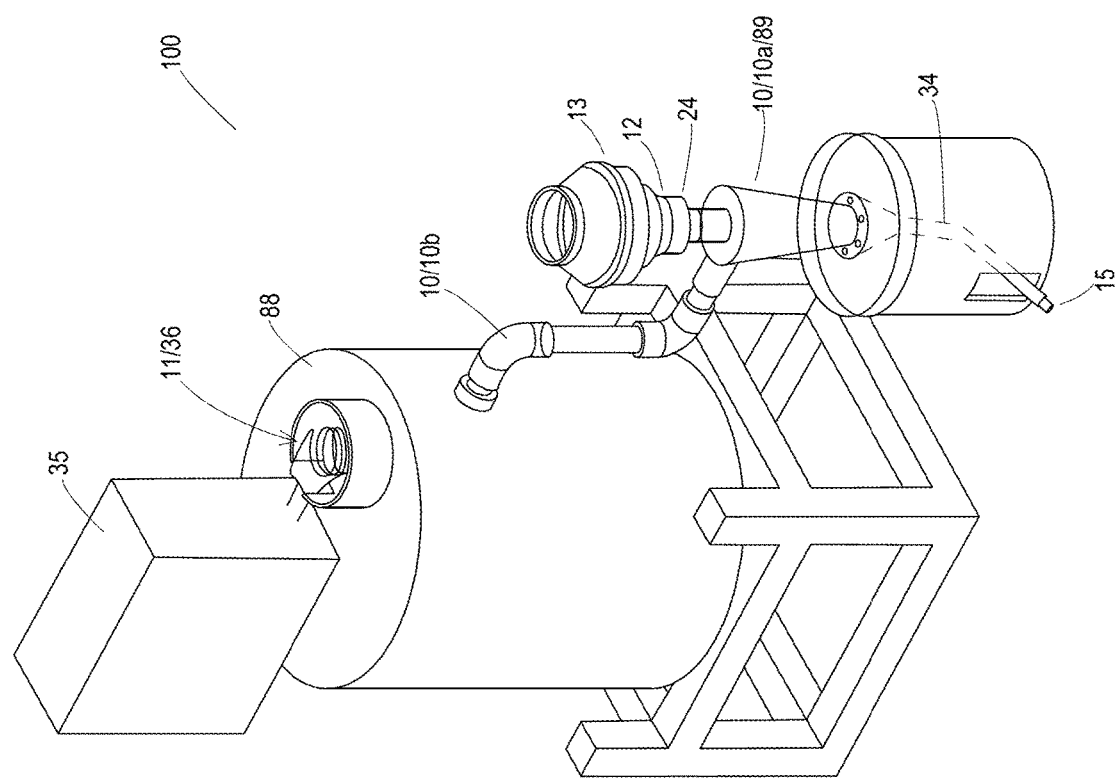
FIG. 22 depicts another exemplary mercury capture system, the exemplary mercury capture system being designed to perform the exemplary mercury capture method shown in FIG. 1.

Another system 100 shown in FIG. 22 was used in a manner similar to that described above. In this system 100, the system 100 can easily be operated as an up or downdraft system. Induction, conduction, or torch heating elements 35 were used for heating the amalgam or sponge gold (not shown). Similarly, this design allowed for the amalgam or sponge gold to be housed in an appropriately sized crucible 36 made of a variety of materials that can withstand the temperatures created during heating.

An up or downdraft is used to extract off-gases from burning into a 55-gal drum 88 (or similarly sized as appropriate) filled with approximately 10 gal of water. Within the drum 88, gases pass through a pipe 10 that extends to within 4 inches of the water level within the drum 88. Drum effluent gases and Hg° aerosols were pulled through a cyclone 89 using an appropriately sized PVC fan 13.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A mercury capture system that captures mercury escaping from a gold or silver amalgam during heating of the amalgam, said mercury capture system comprising:
   at least one conduit extending between (i) a mercury vapor source comprising a heated gold or silver amalgam and (ii) a first outlet of said mercury capture system;
   a fan positioned at the first outlet of said mercury capture system; and
   a mercury vapor collecting vessel (i) positioned between and (ii) in fluid communication with the mercury vapor source and the first outlet of said mercury capture system,
   wherein the mercury capture system reduces an amount of mercury within a first outlet fluid passing through the at least one conduit from proximate the mercury vapor source and exiting the first outlet of said mercury capture system to a level of less than about 100,000 ng/m$^3$ of the first outlet fluid,
   wherein said at least one conduit comprises a middle connecting section positioned between the mercury vapor source and the mercury vapor collecting vessel, and
   wherein said middle connecting section comprises a baffle box, said baffle box comprising one or more baffle plates therein, and each baffle plate comprising a plurality of apertures extending through and providing multiple air flow channels through a given baffle plate.

2. The mercury capture system of claim 1, wherein said at least one conduit comprises a mercury scrubber section positioned between the mercury vapor collecting vessel and the first outlet of said mercury capture system, the mercury scrubber section comprising one or more baffle assemblies positioned along a length of the mercury scrubber section.

3. The mercury capture system of claim 2, wherein said mercury capture system comprises a second outlet in fluid communication with the mercury vapor collecting vessel.

4. The mercury capture system of claim 2, wherein said mercury scrubber section extends vertically between the mercury vapor collecting vessel and the first outlet of said mercury capture system.

5. The mercury capture system of claim 2, wherein said middle connecting section extends diagonally downward from a furnace section outlet to a scrubber inlet along the mercury scrubber section.

6. The mercury capture system of claim 5, wherein the scrubber inlet is positioned above the mercury vapor collecting vessel along the mercury scrubber section.

7. The mercury capture system of claim 1, wherein said fan is coaxially positioned within a cross-sectional exit area of the first outlet of said mercury capture system.

8. The mercury capture system of claim 1, wherein said mercury vapor collecting vessel is positioned directly below and in-line with said fan.

9. The mercury capture system of claim 2, wherein said mercury scrubber section comprises a reduced diameter portion positioned between the mercury vapor collecting vessel and the first outlet of said mercury capture system.

10. The mercury capture system of claim 3, wherein said second outlet is at one end of said mercury scrubber section proximate the mercury vapor collecting vessel.

11. The mercury capture system of claim 2, wherein said first outlet is an outlet of the mercury scrubber section.

12. The mercury capture system of claim 1, wherein (i) a lower surface of the baffle box and (ii) a lower surface of any portion of the middle connecting section between the baffle box and an outlet of the middle connecting section forms a diagonally downward extending line into a scrubber inlet of the mercury scrubber section or the mercury vapor collecting vessel.

13. The mercury capture system of claim 1, further comprising one or more conductive or induction heating elements.

14. The mercury capture system of claim 2, wherein each of the one or more baffle assemblies comprises at least one pair of baffle sheets separated from one another by at least one baffle spacer.

15. The mercury capture system of claim 1, wherein the mercury capture system reduces an amount of mercury within the first outlet fluid passing through the at least one conduit from proximate the mercury vapor source and exiting the first outlet of said mercury capture system to a level of less than about 35,000 ng/m$^3$ of first outlet fluid.

16. The mercury capture system of claim 1, wherein the mercury capture system captures from about 85.0 wt % to about 98.0 wt % of the mercury initially present in the heated gold or silver amalgam processed using the mercury capture system.

17. The mercury capture system of claim 1, wherein the mercury capture system has an overall height of less than about 10.0 feet (ft), an overall length of less than about 12.0 ft, and an overall width of less than about 4.0 ft.

18. A method of using the mercury capture system of claim 1 to capture mercury escaping from a gold or silver amalgam during heating of the amalgam, said method comprising:
   positioning the mercury capture system near a mercury vapor source comprising a heated gold or silver amalgam; and
   turning on the fan.

\* \* \* \* \*